(12) United States Patent
Ciaravola et al.

(10) Patent No.: US 11,458,777 B2
(45) Date of Patent: Oct. 4, 2022

(54) TREAD WEAR MONITORING SYSTEM AND METHOD

(71) Applicant: Bridgestone Europe NV/SA [BE/BE], Zaventem (BE)

(72) Inventors: Vincenzo Ciaravola, Rome (IT); Marco Andrea Maggi, Rome (IT); Alfredo Corollaro, Rome (IT); Lorenzo Alleva, Rome (IT); Alessandro Boldrini, Rome (IT); Valerio Bortolotto, Rome (IT); Rufini Flavia, Rome (IT)

(73) Assignee: Bridgestone Europe N.V./S.A., Zaventem (BE)

( * ) Notice: Subject to any disclaimer, the term of this patent is extended or adjusted under 35 U.S.C. 154(b) by 124 days.

(21) Appl. No.: 17/262,847

(22) PCT Filed: Jul. 30, 2019

(86) PCT No.: PCT/IB2019/056488
§ 371 (c)(1),
(2) Date: Jan. 25, 2021

(87) PCT Pub. No.: WO2020/031022
PCT Pub. Date: Feb. 13, 2020

(65) Prior Publication Data
US 2021/0188017 A1    Jun. 24, 2021

(30) Foreign Application Priority Data
Aug. 6, 2018    (IT) .................. 102018000007884

(51) Int. Cl.
*B60C 11/24*  (2006.01)
*G01M 17/02*  (2006.01)

(52) U.S. Cl.
CPC .......... *B60C 11/246* (2013.01); *G01M 17/02* (2013.01)

(58) Field of Classification Search
CPC .......... B60C 23/0435; B60C 23/0416; B60C 23/0489; B60C 23/0488; B60C 23/0415;
(Continued)

(56) References Cited

FOREIGN PATENT DOCUMENTS

| EP | 2813378 A1 | 12/2014 | |
|---|---|---|---|
| EP | 2813378 B1 * | 12/2016 | ............. B60C 11/24 |

(Continued)

OTHER PUBLICATIONS

International Searching Authority: Search Report for co-pending application PCT/IB2019/056488, dated Dec. 6, 2019, 3 pages.

*Primary Examiner* — Nimeshkumar D Patel
*Assistant Examiner* — Gedeon M Kidanu
(74) *Attorney, Agent, or Firm* — Patterson Intellectual Property Law, P.C.

(57) ABSTRACT

The invention concerns a tread wear monitoring method comprising a preliminary step (6) and a tread wear monitoring step (7). The preliminary step (6) includes: performing tread wear tests on one or more tires; measuring tread-wear-related quantities and first frictional-energy-related quantities, wherein the tread wear-related quantities are indicative of tread wear resulting from the performed tread wear tests, and the first frictional-energy-related quantities are related to frictional energy which the tested tire(s) is/are subject to during the performed tread wear tests; and determining a calibrated tread wear model based on the measured tread-wear-related and first frictional-energy-related quantities. The tread wear monitoring step (7) includes: acquiring, from a vehicle bus (40) of a motor vehicle (4) equipped with two or more wheels fitted, each, with a tire, driving-related (Continued)

quantities related to driving of the motor vehicle (4); computing, based on the acquired driving-related quantities and a predefined vehicle dynamics model related to the motor vehicle (4), second frictional-energy-related quantities related to frictional energy experienced, during driving, by at least one tire of the motor vehicle (4); estimating, based on the second frictional-energy-related quantities and the calibrated tread wear model, tread wear experienced by said at least one tire of the motor vehicle (4) during driving; and estimating a current average remaining tread material amount of said at least one tire of the motor vehicle (4) based on the estimated tread wear. Additionally, the preliminary step (6) further includes: determining, based on one or more of the measured tread-wear-related quantities, a first correction factor related to irregular tread wear due to tire features; and training an artificial neural network to provide second correction factors related to irregular tread wear due to tire usage. Finally, the tread wear monitoring step (7) further includes: providing a second correction factor by means of the trained artificial neural network based on one or more of the acquired driving-related quantities; and computing a corrected remaining tread material amount based on the current average remaining tread material amount, the first correction factor and the second correction factor provided by the trained artificial neural network based on the one or more acquired driving-related quantities.

28 Claims, 4 Drawing Sheets

(58) Field of Classification Search
CPC ............ B60C 23/0447; B60C 23/0494; B60C 23/062; B60C 23/0457; B60C 23/0459; B60C 23/0466; B60C 23/0471; B60C 23/0486; B60C 23/0408; B60C 23/20; B60C 23/0493; B60C 11/24; B60C 23/0401; B60C 23/0433; B60C 11/246; B60C 23/001; B60C 23/003; B60C 23/007; B60C 23/008; B60C 23/009; B60C 23/02; B60C 23/041; B60C 23/0413; B60C 23/0423; B60C 23/0461; B60C 23/0496; B60C 23/0498; B60C 23/061; B60G 2800/984; B60T 2240/06; B60T 2240/07; B60T 2240/08; E01F 9/696; F16D 2066/001; H02S 10/12; H02S 20/21; H02S 20/22; G01L 17/00; G01L 17/005; G01L 19/0092; G01L 19/08; G01L 19/083; G01L 19/086; G01L 5/28; G01L 7/166; G01B 11/22; G01B 2210/50; G01B 5/18; G01M 17/02; G01M 17/027; G01M 17/013; G02F 1/31; G02F 2203/12
See application file for complete search history.

(56) References Cited

FOREIGN PATENT DOCUMENTS

| | | | | |
|---|---|---|---|---|
| EP | 331422 A1 | 5/2018 | | |
| EP | 3318422 A1 * | 5/2018 | ........... | B60C 11/243 |
| WO | 2017156213 A1 | 9/2017 | | |
| WO | WO-2017156213 A1 * | 9/2017 | ........... | B60C 11/246 |

* cited by examiner

TREAD WEAR MONITORING SYSTEM AND METHOD

TECHNICAL FIELD OF THE INVENTION

The present invention relates to a method and a system for tread wear monitoring with the capability to estimate tread wear and Remaining Tread Material (RTM) of tires of motor vehicles (e.g., vehicles fitted with internal combustion engines, hybrid vehicles, electric vehicles, etc.).

STATE OF THE ART

As is broadly known, tires of motor vehicles are subject, with use, to deterioration; in particular, tire tread is subject to wear that causes tread depth to reduce over time. When the tread depth reaches a certain end-of-life tread depth, the tire should be replaced in order not to impair driving safety.

Unfortunately, many drivers do not regularly check tread depth of tires of their motor vehicles, with the consequent risk of carrying on driving even when the tread depth of one or more tires has reached (or, even worse, has become lower than) the end-of-life tread depth, thereby running a serious risk of safety. In fact, typically, a common driver owns no tread depth measuring tool and may forget to have tires of his/her motor vehicle periodically checked in a tire shop.

Therefore, in the automotive sector there is markedly felt the need for technologies capable of estimating RTM.

For example, known solutions of this kind are provided in WO 2017/156213 A1 and WO 2017/156216 A1, which relate to a vehicle integrated expected tread-life indicator system and a driving companion tread-life indicator system, respectively. In particular, both said International applications disclose a computer-implemented method for monitoring tire tread-life, which method comprises:
  receiving, by one or more processors, data associated with one or more tread depth measurements, the one or more tread depth measurements made by a measurement device external to a vehicle, the one or more tread depth measurements descriptive of a tread depth of at least one tread of at least one tire of the vehicle;
  associating, by the one or more processors, a respective time value or a distance value with each of the one or more tread depth measurements;
  accessing, by the one or more processors, a model that correlates the one or more tread depth measurements to a projected tread depth;
  determining, by the one or more processors, an estimated time or an estimated distance at which the projected tread depth is expected to equal or pass a tread depth threshold based at least in part on the model; and
  providing, by the one or more processors, the estimated time or the estimated distance to a notification system.
Said notification system is integrated:
  according to WO 2017/156213 A1, into the vehicle whereas,
  according to WO 2017/156216 A1, into a user computing device (e.g., a smartphone or a tablet).

Also the Applicant has felt the need to develop a technology for estimating tread wear and RTM of tires of motor vehicles (e.g., vehicles fitted with internal combustion engines, hybrid vehicles, electric vehicles, etc.). In this respect, Applicant's Italian patent application No. 102018000006322 filed on Jun. 14, 2018, discloses a tread wear monitoring method that comprises:
  a tread wear model calibration step, which is schematically illustrated in FIG. 1 (where it is denoted as a whole by 1); and
  a tread wear monitoring step, which is schematically illustrated in FIG. 2 (where it is denoted as a whole by 2).

In particular, as shown in FIG. 1, the tread wear model calibration step 1 includes:
  performing tread wear tests on one or more tires (block 11), preferably by using one or more tire test systems/devices/machines, such as one or more indoor wear test machines;
  measuring tread-wear-related quantities indicative of tread wear resulting from the performed tread wear tests, and first frictional-energy-related quantities related to frictional energy which the tested tire(s) is/are subject to during the performed tread wear tests (block 12); and
  determining a calibrated Tread Wear Model (TWM) based on the measured tread-wear-related and first frictional-energy-related quantities (block 13).

Conveniently, the tread-wear-related quantities are indicative of tread depth reductions resulting from the performed tread wear tests.

Preferably, determining a calibrated TWM (block 13) includes:
  providing a predefined reference TWM that mathematically relates
    frictional energy experienced by a (generic) tire along a (generic) driving route
    to tread wear caused by said frictional energy
    through given parameters;
  computing calibration values of the given parameters based on the predefined reference TWM and the measured tread-wear-related and first frictional-energy-related quantities (conveniently, by applying the measured tread-wear-related and first frictional-energy-related quantities into the predefined reference TWM to compute the calibration values of the given parameters); and
  determining the calibrated TWM based on the predefined reference TWM and the computed calibration values (conveniently, by applying the computed calibration values in the predefined reference TWM).

The predefined reference TWM is conveniently based on a predefined mathematical formulation of tire wear physics, whose parameters can be computed on the basis of measurements of the tread wear and of the frictional energy during the tread wear tests. In particular, the predefined mathematical formulation is based on the observation that a tread of a tire is worn of an amount proportional to the frictional energy that the tire experiences along a driving route, and to its intrinsic capability to withstand abrasion. For example, the predefined reference TWM may be expressed in mathematical terms as:

$$W_T = f_{n,k,\ldots}(E_{FR}) \quad (1)$$

where
  $E_{FR}$ denotes the frictional energy experienced by a (generic) tire along a (generic) driving route,
  $W_T$ denotes the tread wear (e.g., expressed in terms of average tread skid loss, i.e., average tread depth reduction over tread width) due to the frictional energy $E_{FR}$, and
  $f_{n,k,\ldots}(E_{FR})$ denotes a predefined mathematical function of the frictional energy $E_{FR}$, which predefined mathematical function is characterized by a set of given parameters n, k, ... and allows computing, based on the frictional energy $E_{FR}$, the tread wear $W_T$ due to said frictional energy $E_{FR}$.

Preferably, the predefined reference TWM and, hence, the equation (1) may be advantageously expressed according to the following mathematical formula:

$$W_T = k \cdot (E_{FR})^n, \quad (2)$$

wherein n is related to full tire resistance to wear (abradability) and
k is related to tire sensitivity to wear by external factor (e.g., surface).

In particular, the parameters n and k define the shape of the function "wear vs frictional energy", which is specific of each tire model (pattern, compound, construction).

In turn, the frictional energy $E_{FR}$ may be expressed, in either of the equations (1) and (2), as:

$$E_{FR} = g(Q_1, Q_2, Q_3, \ldots) \quad (3)$$

where $Q_1, Q_2, Q_3, \ldots$ denote frictional-energy-related quantities that typically vary along a driving route (wherein said frictional-energy-related quantities $Q_1, Q_2, Q_3, \ldots$ may conveniently include one or more of the following quantities: total cornering and longitudinal forces, sliding forces, slip angle, slip ratio, cornering stiffness, braking/traction stiffness, etc.), and $g(Q_1, Q_2, Q_3, \ldots)$ denotes a predefined function of the frictional-energy-related quantities $Q_1, Q_2, Q_3, \ldots$, which predefined mathematical function allows computing the overall frictional energy $E_{FR}$ experienced by a (generic) tire over a driving route on the basis of the frictional-energy-related quantities $Q_1, Q_2, Q_3, \ldots$ over said driving route.

In view of the foregoing, it is clear that, by measuring the first frictional-energy-related quantities (block 12 in FIG. 1) during the tread wear tests performed (block 11 in FIG. 1), it is possible to compute (block 13 in FIG. 1) the overall frictional energy $E_{FR}$ experienced by the tire(s) under test on the basis of the equation (3). Then, it is possible to compute (again block 13 in FIG. 1) the set of given parameters n, k, ... based on the equation (1), the overall frictional energy $E_{FR}$ computed based on the equation (3), and the tread-wear-related quantities measured (block 12 in FIG. 1) for the tread wear tests. Otherwise, it is possible to compute (block 13 in FIG. 1) the given parameters n and k based on the equation (2), the overall frictional energy $E_{FR}$ computed based on the equation (3), and the tread-wear-related quantities measured (block 12 in FIG. 1) for the tread wear tests.

Conveniently, as for the tread wear testing (block 11 in FIG. 1), it is possible to define a driving route to be simulated and, then, simulate said driving route by one or more tire test systems/devices/machines, such as one or more indoor wear test machines, which provide(s), during the performed tread wear tests, measurements of the first frictional-energy-related quantities (e.g., total cornering and longitudinal forces, slip angle, slip ratio, cornering stiffness, etc.). Instead, the tread-wear-related quantities may be conveniently measured after each simulated driving route by means of a tread depth measuring tool.

From the foregoing, it is clear that the tread wear model calibration step 1 allows obtaining, for each type/model of tire, a respective specifically-calibrated TWM. Conveniently, the tread wear model calibration step 1 may be carried out to obtain, for each type/model of tire, a plurality of respective specifically-calibrated TWMs depending on mounting position of a tire on a motor vehicle, such as a first calibrated TWM for tires mounted on front wheels and a second calibrated TWM for tires mounted on rear wheels, or even, in case of four-wheeled motor vehicles, a first calibrated TWM for a tire mounted on a front right wheel, a second calibrated TWM for a tire mounted on a front left wheel, a third calibrated TWM for a tire mounted on a rear right wheel, and a fourth calibrated TWM for a tire mounted on a rear left wheel.

Additionally, as shown in FIG. 2, the tread wear monitoring step 2 includes:

acquiring, from a vehicle bus of a motor vehicle (e.g., a scooter, a motorbike, a car, a van, a truck, etc.) equipped with two or more wheels fitted, each, with a tire, driving-related quantities (e.g., longitudinal and transversal accelerations, speed, steering angle, yaw rate, vehicle side slip, wheel angular speed, etc.) related to driving of the motor vehicle (block 21);

computing, based on the acquired driving-related quantities and a predefined vehicle dynamics model related to the motor vehicle, second frictional-energy-related quantities related to frictional energy experienced, during driving, by the tires of the motor vehicle (block 22);

estimating (block 23)

tread wear experienced by the tires of the motor vehicle during driving on the basis of the second frictional-energy-related quantities and of the calibrated TWM and RTM of the tires of the motor vehicle based on the estimated tread wear.

Preferably, computing the second frictional-energy-related quantities (block 22) includes:

providing a predefined vehicle dynamics model that is related to the motor vehicle and that mathematically relates the driving-related quantities (e.g., longitudinal and transversal accelerations, speed, steering angle, yaw rate, vehicle side slip, wheel angular speed, etc.) acquired from the vehicle bus of the motor vehicle during driving to the second frictional-energy-related quantities related to the frictional energy experienced, during driving, by the tires of the motor vehicle; and computing said second frictional-energy-related quantities based on the predefined vehicle dynamics model and the acquired driving-related quantities (conveniently, by inputting said acquired driving-related quantities into the predefined vehicle dynamics model).

The predefined vehicle dynamics model is conveniently based on a predefined mathematical formulation of dynamics of the motor vehicle, which predefined mathematical formulation allows computing, based on measurements carried out on board the vehicle (i.e., the measurements producing the driving-related quantities), forces and slippages experienced by the tires during driving. For example, the predefined vehicle dynamics model may be expressed in mathematical terms as:

$$Q_1, Q_2, Q_3, \ldots = h(P_1, P_2, P_3, \ldots) \quad (4)$$

where $P_1, P_2, P_3, \ldots$ denote the acquired driving-related quantities (which, as previously explained, may include longitudinal and transversal accelerations, speed, steering angle, yaw rate, vehicle side slip, wheel angular speed, etc.), $Q_1, Q_2, Q_3, \ldots$ denote, in this case, the second frictional-energy-related quantities (e.g., total cornering and longitudinal forces, slip angle, slip ratio, cornering stiffness, etc.), and $h(P_1, P_2, P_3, \ldots)$ denotes a predefined mathematical function of the acquired driving-related quantities $P_1$, $P_2$, $P_3, \ldots$, which predefined mathematical function allows computing, based on said acquired driving-related quantities $P_1, P_2, P_3, \ldots$, the second frictional-energy-related quantities $Q_1, Q_2, Q_3, \ldots$.

Thence, once the second frictional-energy-related quantities $Q_1, Q_2, Q_3, \ldots$ have been computed based on the acquired driving-related quantities $P_1, P_2, P_3, \ldots$ and the equation (4), it is possible to estimate tread wear experienced by the tires of the motor vehicle during driving by inputting the second frictional-energy-related quantities $Q_1$, $Q_2, Q_3, \ldots$ into the calibrated TWM (block 23 in FIG. 2); namely, by inputting the second frictional-energy-related quantities $Q_1, Q_2, Q_3, \ldots$ into the predefined reference TWM characterized by the calibration values of the given parameters computed in the tread wear model calibration step 1.

In extreme synthesis, in the tread wear model calibration step 1, the tread-wear-related quantities (i.e., $W_T$ in the equations (1) and (2)) and the first frictional-energy-related quantities (i.e., $Q_1, Q_2, Q_3, \ldots$ in the equation (3)) are "known", whereas the given parameters (i.e., n, k, ... in the equation (1), and n and k in the equation (2)) are "unknown" but may be computed by using the equations (1) and (3), or (2) and (3).

Instead, in the tread wear monitoring step 2, the given parameters (i.e., n, k, ... in the equation (1), and n and k in the equation (2)) are known from the tread wear model calibration step 1, and also the driving-related quantities (i.e., $P_1, P_2, P_3, \ldots$ in the equation (4)) are "known" from the measurements on board the vehicle. Therefore, the tread wear (i.e., $W_T$ in the equations (1) and (2)) may be estimated by using the equations (1), (3) and (4), or (2), (3) and (4).

Conveniently, for each type/model of motor vehicle, a respective predefined vehicle dynamics model is used in the tread wear monitoring step 2 to compute the second frictional-energy-related quantities (block 22 in FIG. 2). More conveniently, for each type/model of motor vehicle, a plurality of respective predefined vehicle dynamics models may be used to take account of different mounting positions of the tires on a motor vehicle (i.e., front and rear wheels, or front right and left wheels and rear right and left wheels).

Preferably, estimating tread wear (block 23 in FIG. 2) includes computing, based on the second frictional-energy-related quantities and the calibrated TWM, a tread wear value indicative of a reduction in tread depth due to a distance driven by the motor vehicle, and estimating RTM (again block 23 in FIG. 2) includes computing a remaining tread depth based on the tread wear value and an initial tread depth. Conveniently, the remaining tread depth is expressed in terms of a percentage of remaining tread depth with respect to the initial tread depth.

Additionally, estimating RTM (block 23 in FIG. 2) conveniently includes detecting an approaching end-of-life condition for the tires of the motor vehicle if the remaining tread depth reaches a predefined threshold (e.g., if the remaining tread depth percentage reaches, or falls below, 20% of the initial tread depth).

Preferably, tread wear and RTM estimation (block 23 in FIG. 2) is carried out every N kilometers/miles driven by the motor vehicle, wherein N denotes a predefined positive integer (e.g., N may be equal to 5000 or 10000, or even a smaller number of kilometres/miles).

Accuracy and reliability of the tread wear and RTM estimation (block 23 in FIG. 2) may be conveniently enhanced if the driver/owner of the motor vehicle under tread wear monitoring goes to a tire shop to have the tread depth of the tires of his/her motor vehicle measured. In fact, the estimated tread wear and RTM may be advantageously corrected based on tread depth measurements performed by means of a tread depth measuring tool (since said measurements allows wiping out estimation errors and, hence, resetting the tread wear and RTM estimation).

Additionally, 102018000006322 discloses also a tread monitoring system, which is schematically illustrated in FIG. 3 (where it is denoted as a whole by 3) and which includes:

an acquisition device 31, which is
  installed on board a motor vehicle (not shown in FIG. 3—e.g., a scooter, a motorbike, a car, a van, a truck, etc.) equipped with two or more wheels fitted, each, with a tire, and
  coupled to a vehicle bus 40 (e.g., based on Controller Area Network (CAN) bus standard) of said motor vehicle to acquire the driving-related quantities (block 21 in FIG. 2);

a processing device/system 32, which is connected, in a wired or wireless fashion, to the acquisition device 31 to receive therefrom the driving-related quantities, and which is programmed to
  compute the second frictional-energy-related quantities (block 22 in FIG. 2) and
  estimate tread wear and RTM (block 23 in FIG. 2); and a notification device 33 configured to inform a user associated with the motor vehicle (e.g., a driver and/or an owner thereof) of the RTM of the tires estimated by the processing device/system 32.

Conveniently, the notification device 33 is configured to warn the user associated with the motor vehicle against an approaching end-of-life condition detected by the processing device/system 32 for the tires of the motor vehicle.

Additionally, FIGS. 4 and 5 schematically illustrate two specific preferred embodiments of the tread wear monitoring system 3 according to 102018000006322.

In particular, with reference to FIG. 4, in a first specific preferred embodiment (denoted as a whole by 3A) of the tread wear monitoring system 3:

the processing device/system 32 is implemented/carried out by means of a cloud computing system 32A that is wirelessly and remotely connected to the acquisition device 31 (e.g., via one or more mobile communications technologies, such as GSM, GPRS, EDGE, HSPA, UMTS, LTE, LTE Advanced and/or future 5th generation (or even beyond) wireless communications systems); and the notification device 33 is implemented/carried out by means of an electronic communication device 33A (such as a smartphone, a tablet, a laptop, a desktop computer, a smart TV, a smartwatch, etc.), which is associated with (e.g., owned and/or used by) the user (in FIG. 4 denoted by 5) associated with the motor vehicle (in FIG. 4 denoted by 4), and which is remotely connected to the cloud computing system 32A via one or more wired and/or wireless networks.

Preferably, the cloud computing system 32A is programmed to send a RTM notification to the electronic communication device 33A that, then, provides the user 5 with said RTM notification. For example, the electronic communication device 33A may conveniently be a smartphone or tablet on which a software application (i.e., a so-called app) is installed, which app is configured to receive, from the cloud computing system 32A, a push notification indicating the estimated RTM of the tires. Other types of RTM notification may be also used, such as SMS messages, email messages or, more in general, messages of text and/or audio and/or image and/or video and/or multimedia type(s).

It is worth noting that the cloud computing system 32A may be advantageously used to provide many motor vehicles 4 and, hence, many users 5 with a tread wear monitoring service.

Instead, with reference to FIG. 5, in a second specific preferred embodiment (denoted as a whole by 3B) of the tread wear monitoring system 3:

- the processing device/system 32 is implemented/carried out by means of an (automotive) Electronic Control Unit (ECU) 32B installed on board the motor vehicle 4; and
- the notification device 33 is implemented/carried out by means of a Human-Machine Interface (HMI) 33B provided on board the motor vehicle 4.

In said second specific preferred embodiment 3B, the ECU 32B may conveniently inform a driver of the motor vehicle 4 of the estimated RTM of the tires via a graphical message displayed by the HMI 33B (which, thence, may conveniently comprise a screen and/or a graphical indicator).

The ECU 32B may conveniently be an ECU specifically dedicated to tread wear monitoring, or an ECU dedicated to several tasks including also tread wear monitoring.

Similarly, the HMI 33B may conveniently be a HMI specifically dedicated to tread wear monitoring, or a HMI dedicated to several tasks including also tread wear monitoring (e.g., a HMI of an onboard infotelematics and/or driver assistance system).

In view of the foregoing, it is clear that the tread wear monitoring method and system according to 102018000006322, by taking account of tire wear physics, vehicle dynamics and driving style, allow automatically estimating tire tread wear and RTM in a very efficient and reliable way with neither the necessity for a driver to own a tread depth measuring tool, nor to go to a tire shop to have tread depth of tires of his/her motor vehicle measured.

OBJECT AND SUMMARY OF THE INVENTION

The tread wear monitoring method according to 102018000006322 allows estimating tread wear as average material consumption along tread profile, whereby a perfectly regular tread wear is implicitly assumed (namely, it is assumed that all tread ribs wear out with substantially the same speed).

However, the Applicant has noticed that, in many cases, tire tread irregularly wears out with one or more ribs wearing out pretty faster due to tire design and usage.

Thence, object of the prevent invention is that of providing an improved tread wear monitoring method and an improved tread wear monitoring system, which allow estimating Remaining Tread Material (RTM) with enhanced accuracy by taking account of irregular tread wear.

This object is achieved by the present invention in that it relates to a tread wear monitoring method and a tread wear monitoring system, as defined in the appended claims.

BRIEF DESCRIPTION OF THE DRAWINGS

For a better understanding of the present invention, preferred embodiments, which are intended purely by way of non-limiting examples, will now be described with reference to the attached drawings (all not to scale), where.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, without departing from the scope of the present invention as claimed. Thence, the present invention is not intended to be limited to the embodiments shown and described, but is to be accorded the widest scope of protection consistent with the principles and features disclosed herein and defined in the appended claims.

The present invention concerns an improved tread wear monitoring method (in particular, improved with respect to the solution according to the Applicant's Italian patent application No. 102018000006322), which includes a preliminary step and an improved tread wear monitoring step.

Figure 6:
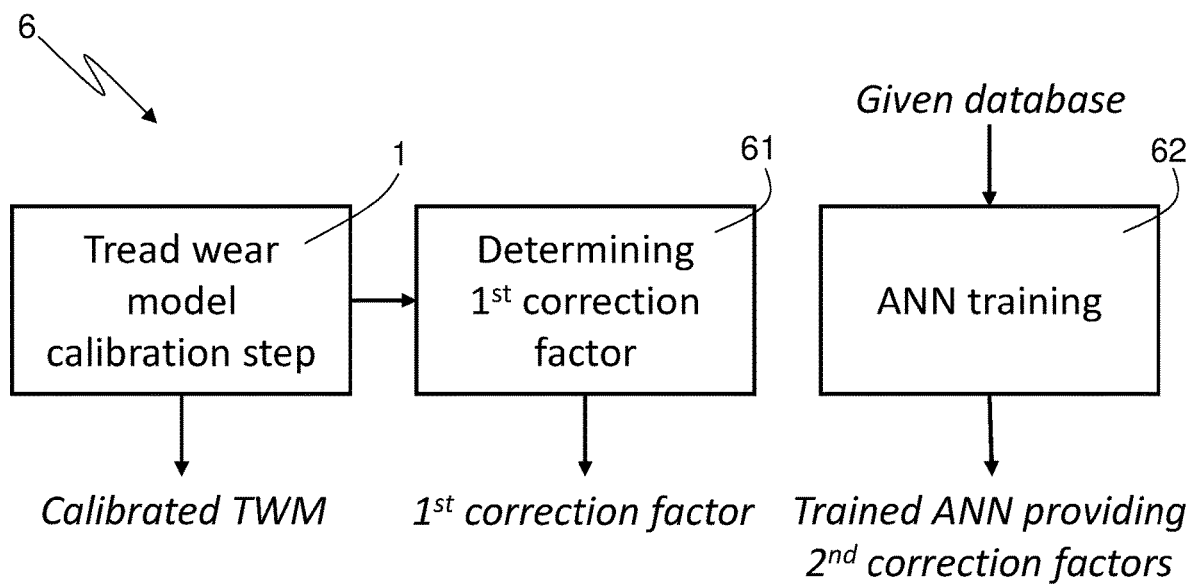
FIGS. 6 and 7 schematically illustrate, respectively, a preliminary step and an improved tread wear monitoring step of an improved tread wear monitoring method according to a preferred embodiment of the present invention.

In this connection, FIG. 6 schematically illustrates a preliminary step (denoted as a whole by 6) according to a preferred embodiment of the present invention. In particular, the preliminary step 6 comprises carrying out the tread wear model calibration step 1 of the tread wear monitoring method according to 102018000006322, thereby determining a calibrated Tread Wear Model (TWM). In this respect, it is worth drawing the attention to the fact that, in consideration of the foregoing detailed description of the tread wear model calibration step 1, in the following said tread wear model calibration step 1 will not be described again, remaining valid what described in the foregoing, except relevant differences/changes that, instead, will be explicitly described hereinafter.

Figure 1:
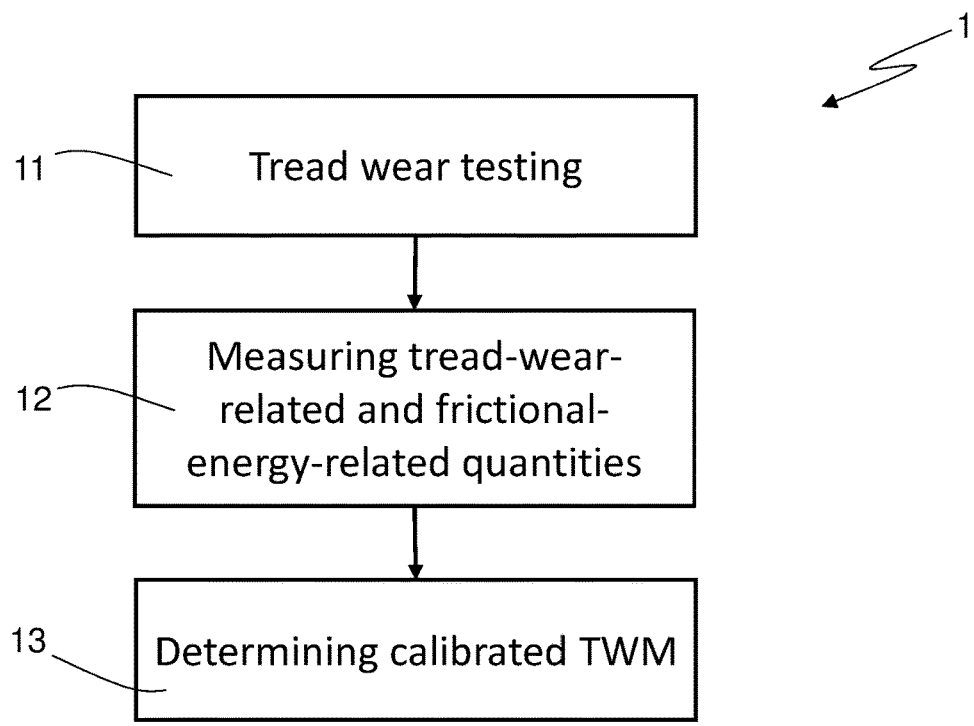
FIGS. 1 and 2 schematically illustrate, respectively, a tread wear model calibration step and a tread wear monitoring step of a tread wear monitoring method according to Applicant's Italian patent application No. 102018000006322.

Additionally, the preliminary step 6 further comprises:

- determining, based on one or more of the measured tread-wear-related quantities (which are measured at the block 12 in FIG. 1 and are indicative of tread wear resulting from the tread wear tests performed at the block 11 in FIG. 1), a first correction factor related to irregular tread wear due to tire features (e.g., pattern, construction, etc.)—block 61 in FIG. 6; and
- training an Artificial Neural Network (ANN) to provide second correction factors related to irregular tread wear due to tire usage (e.g., due to driving style, driving route, vehicle features, etc.)—block 62 in FIG. 6.

Preferably, the first correction factor is indicative of a first ratio of Remaining Tread Material (RTM) at most worn-out tread point to average RTM for irregular tread wear due to tire features, and each second correction factor is indicative of a respective second ratio of RTM at most worn-out tread point to average RTM for irregular tread wear due to tire usage.

In detail, according to a specific, non-limiting preferred embodiment of the present invention:

performing tread wear tests (block 11 in FIG. 1) includes
defining a test driving route to be simulated and performing a tread wear test on a given tire by means of a tire test system/device/machine (such as an indoor wear test machine) simulating the test driving route;
measuring tread-wear-related quantities (block 12 in FIG. 1) includes measuring, by means of a tread depth measuring tool, a tread depth profile of the given tire, which tread depth profile results from the simulated test driving route; and
determining a first correction factor (block 61 in FIG. 6) includes
determining, based on the measured tread depth profile, a first worst-point RTM amount $RTM_{1,WP}$ at a most worn-out tread point of the given tire (e.g., at the most worn-out tread rib) and a first average RTM amount $RTM_{1,AV}$ over tread profile of said given tire, and
computing a first correction factor $CF_1$ as a ratio of the first worst-point RTM amount $RTM_{1,WP}$ to the first average RTM amount $RTM_{1,AV}$ (namely, $CF_1 = RTM_{1,WP}/RTM_{1,AV}$).

Conveniently, performing tread wear tests (block 11 in FIG. 1) includes also:
selecting one or more vehicle models and one or more tire models;
defining one or more test driving routes to be simulated; and
performing one or more tread wear tests on one or more given tires of the selected tire model(s) by means of one or more tire test systems/devices/machines (such as one or more indoor wear test machines) simulating the test driving route(s) driven by one or more motor vehicles of the selected vehicle model(s) fitted with the given tire(s).

In this way, it is possible to define (block 61 in FIG. 6) different first correction factors for different vehicle models, different tire models and different test driving routes.

Preferably, the ANN is trained (block 62 in FIG. 6) based on a given database (e.g., a wear fleet database) including tire-usage-related statistical data and corresponding RTM-related statistical data.

More preferably, the tire-usage-related statistical data are indicative of recorded tire-usage-related quantities (e.g., vehicle and route parameters typically causing irregular tread wear, such as route severity expressed as Root Mean Square (RMS) of transversal and longitudinal accelerations, vehicle wheel alignment and tire inflation pressure) associated with used tires and resulted in irregular tread wear of said used tires, whereas the corresponding RTM-related statistical data are indicative of pairs of RTM amounts determined for the used tires, wherein each pair of RTM amounts:
is related to a respective used tire and corresponds to respective recorded tire-usage-related quantities associated with said respective used tire; and
includes a respective second worst-point RTM amount $RTM_{2,WP}$ at a most worn-out tread point of the respective used tire and a respective second average RTM amount $RTM_{2,AV}$ over tread profile of said respective used tire.

Additionally, training the ANN (block 62 in FIG. 6) preferably includes:
computing, for each used tire, a respective second correction factor $CF_2$ as a ratio of the respective second worst-point RTM amount $RTM_{2,WP}$ to the respective second average RTM amount $RTM_{2,AV}$ (namely, $CF_2 = RTM_{2,WP}/RTM_{2,AV}$); and
training the ANN by carrying out a supervised learning technique including applying to the ANN, for each used tire, the recorded tire-usage-related quantities associated with said used tire as inputs and the respective second correction factor $CF_2$ as output, whereby the ANN becomes trained to output, based on input tire-usage-related quantities, a corresponding second correction factor $CF_2$.

It is worth noting that the first and second correction factors $CF_1$ and $CF_2$ are typically smaller than one due to irregular tread wear (whereas they would be equal to one for perfectly regular tread wear), wherein the smaller the first/second worst-point RTM amount $RTM_{1,WP}$, $RTM_{2,WP}$ is with respect to the first/second average RTM amount $RTM_{1,AV}$, $RTM_{2,AV}$ (e.g., due to an extremely irregular tread wear), the smaller the first/second correction factor $CF_1$, $CF_2$.

Thence, the first and second correction factors $CF_1$ and $CF_2$ can be advantageously exploited in the improved tread wear monitoring step to refine the RTM estimation performed by carrying out the previously described tread wear monitoring step 2 according to 102018000006322 (which RTM estimation, as previously explained, is based on an average tread wear estimation over tread profile whereby irregular tread wear is neglected). In this way, it is possible to obtain a more accurate RTM estimation (i.e., a more accurate tire Remaining Useful Life (RUL) estimation), which takes account also of irregular tread wear. In mathematical terms, this RTM estimation refinement can be conveniently expressed as:

$$RTM_{refined} = RTM_{average} \cdot CF_1 \cdot CF_2 \qquad (5)$$

where
$RTM_{average}$ denotes a third average RTM amount estimated by implementing the previously described tread wear monitoring step 2 according to 102018000006322; and
$RTM_{refined}$ denotes a corrected RTM amount taking account of irregular tread wear due to tire features (via $CF_1$) and tire usage (via $CF_2$).

Figure 7:
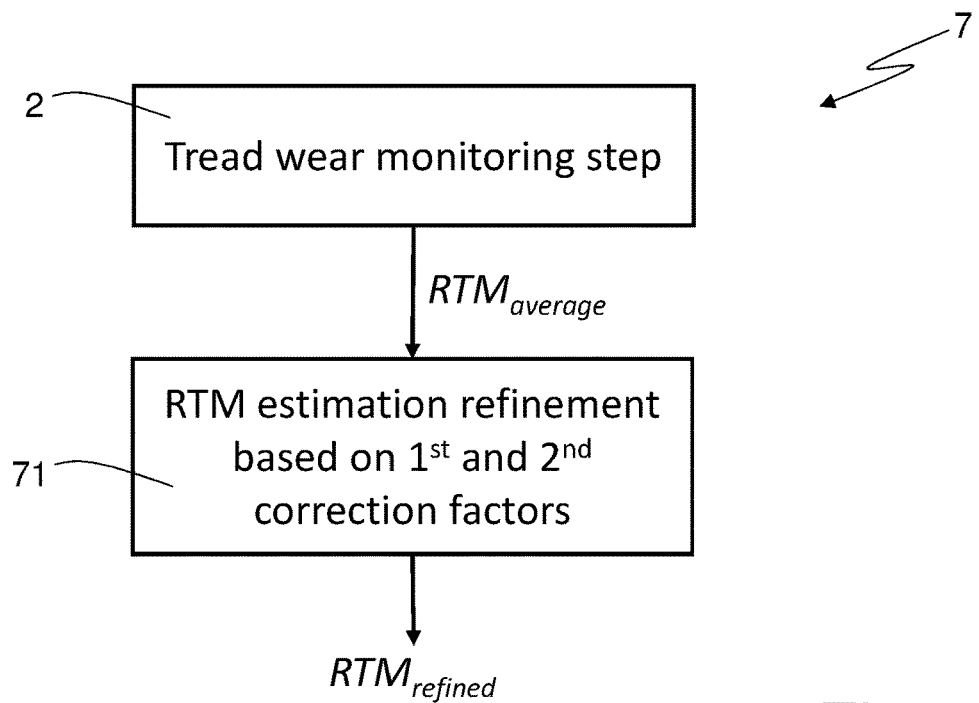

In this connection, FIG. 7 schematically illustrates an improved tread wear monitoring step (denoted as a whole by 7) according to a preferred embodiment of the present invention. In particular, the improved tread wear monitoring step 7 comprises:
carrying out the tread wear monitoring step 2 of the tread wear monitoring method according to 102018000006322, thereby obtaining a third average RTM amount $RTM_{average}$; and
performing an RTM estimation refinement (block 71) based on the first and second correction factors $CF_1$ and $CF_2$ (conveniently, by using the equation (5)), thereby obtaining a corrected RTM amount $RTM_{refined}$ taking account of irregular tread wear due to tire features and tire usage.

In this respect, it is worth drawing the attention to the fact that, in consideration of the foregoing detailed description of the tread wear monitoring step 2, in the following said tread wear monitoring step 2 will not be described again, remaining valid what described in the foregoing, except relevant differences/changes that, instead, will be explicitly described hereinafter.

Figure 2:
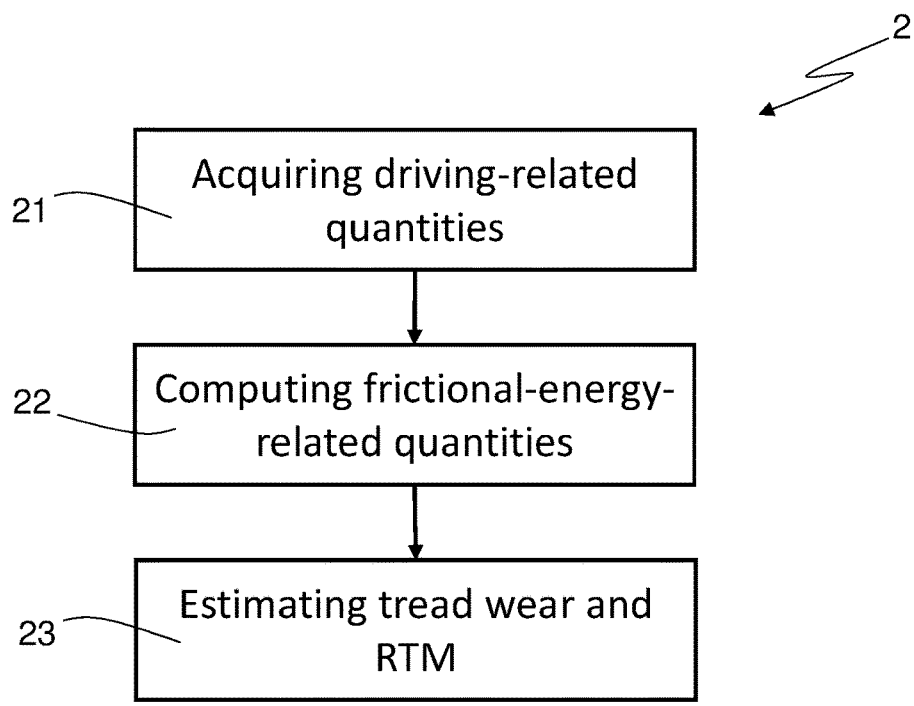

More in detail, performing an RTM estimation refinement (block 71 in FIG. 7) comprises:
providing a second correction factor $CF_2$ by means of the trained ANN based on one or more of the acquired driving-related quantities (acquired at the block 21 in FIG. 2); and
correcting the third average RTM amount $RTM_{average}$ based on the first correction factor $CF_1$ and the second correction factor $CF_2$ provided by the trained ANN based on the one or more acquired driving-related quantities.

Preferably, the acquired driving-related quantities include acceleration-related quantities indicative of transversal and longitudinal accelerations of the vehicle under tread wear monitoring, and providing a second correction factor $CF_2$ by means of the trained ANN includes:
computing, based on the acceleration-related quantities, mean-acceleration-related quantities indicative of mean transversal and longitudinal accelerations of the vehicle under tread wear monitoring (such as RMS of transversal and longitudinal accelerations); and
inputting into the trained ANN the mean-acceleration-related quantities, at least a pressure-related quantity indicative of a tire inflation pressure associated with the tire under tread wear monitoring, and quantities related to toe, camber and load that are associated with the tire and the vehicle under tread wear monitoring, whereby the trained ANN outputs a corresponding correction factor $CF_2$.

Conveniently, the pressure-related quantity may be included in the acquired driving-related quantities or may be a predefined pressure-related quantity stored in memory, whereas the quantities related to toe, camber and load are predefined quantities stored in memory.

To put the foregoing in a different perspective, in the ANN training (block 62 in FIG. 6) performed in the preliminary step 6 based on the tire-usage-related statistical data and the RTM-related statistical data, the ANN is trained to learn the following function to be used in the improved tread wear monitoring step 7 (in particular, for determining the second correction factor $CF_2$ to be used in the RTM estimation refinement—block 71 in FIG. 7):

$$CF_2 = r(RMS_{Ay}, RMS_{Ax}, P_{ressure}, T_{oe}, C_{amber}, L_{oad}) \quad (6)$$

where
$RMS_{Ay}$ and $RMS_{Ax}$ denote the mean-acceleration-related quantities indicative of, respectively, mean transversal and longitudinal accelerations of the vehicle under tread wear monitoring (in particular, RMS of transversal and longitudinal accelerations);
$P_{ressure}$ denotes the pressure-related quantity;
$T_{oe}$, $C_{amber}$, and $L_{oad}$ denote the quantities related to, respectively, toe, camber and load; and
$CF_2$, as previously explained, is equal to $RTM_{2,WP}/RTM_{2,AV}$.

From the foregoing, it is immediately clear that the ANN training (block 62 in FIG. 6) of the preliminary step 6 may be conveniently performed so as to obtain different ANN specifically trained for different tire models and/or different vehicle models.

Figure 3:
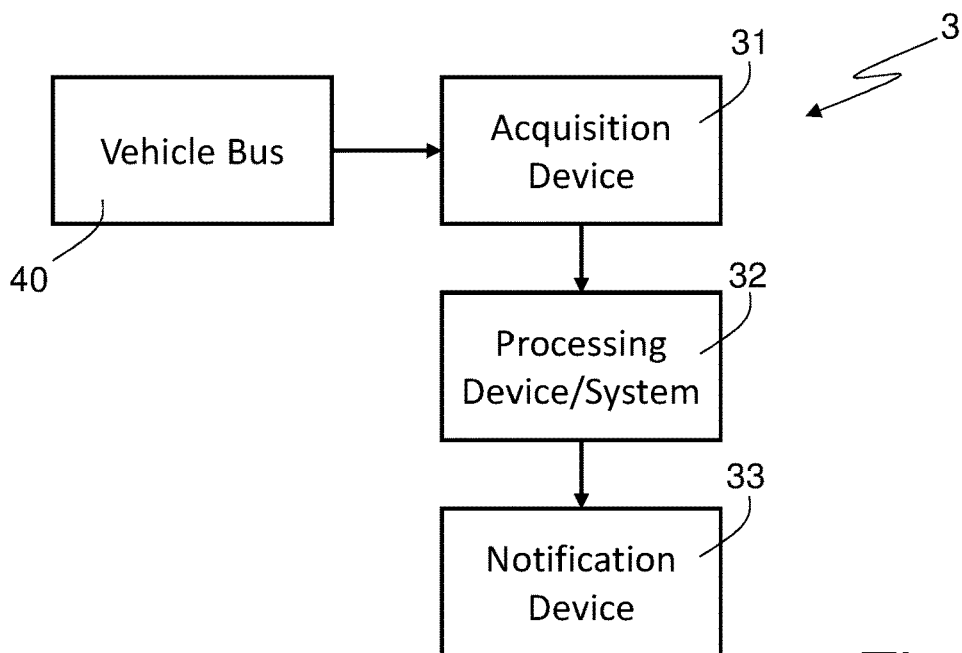
FIG. 3 schematically illustrates a tread wear monitoring system according to 102018000006322 for carrying out the tread wear monitoring step of FIG. 2.

The present invention concerns also an improved tread wear monitoring system that, from an architectural point of view, has the same architecture as the tread wear monitoring system 3 according to 102018000006322 shown in FIG. 3 and previously described in detail, wherein the processing device/system 32, according to the present invention, stores in an internal memory the first correction factor $CF_1$, includes the trained ANN, and is programmed to carry out the improved tread wear monitoring step 7 by carrying out the tread wear monitoring step 2 according to 102018000006322 and by performing FIG. 7).

Figure 4:
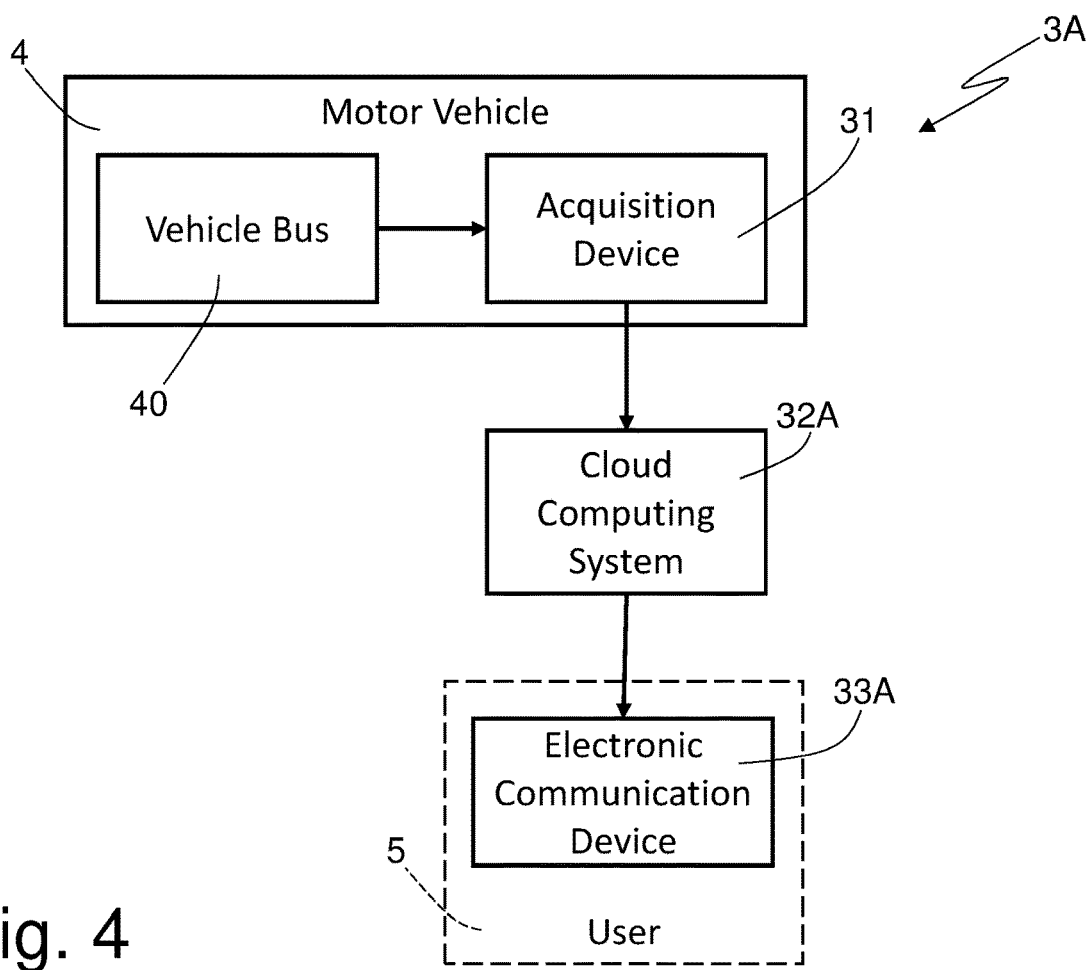
FIGS. 4 and 5 schematically illustrate two specific preferred embodiments of the tread wear monitoring system of FIG. 3 according to 102018000006322.
Figure 5:
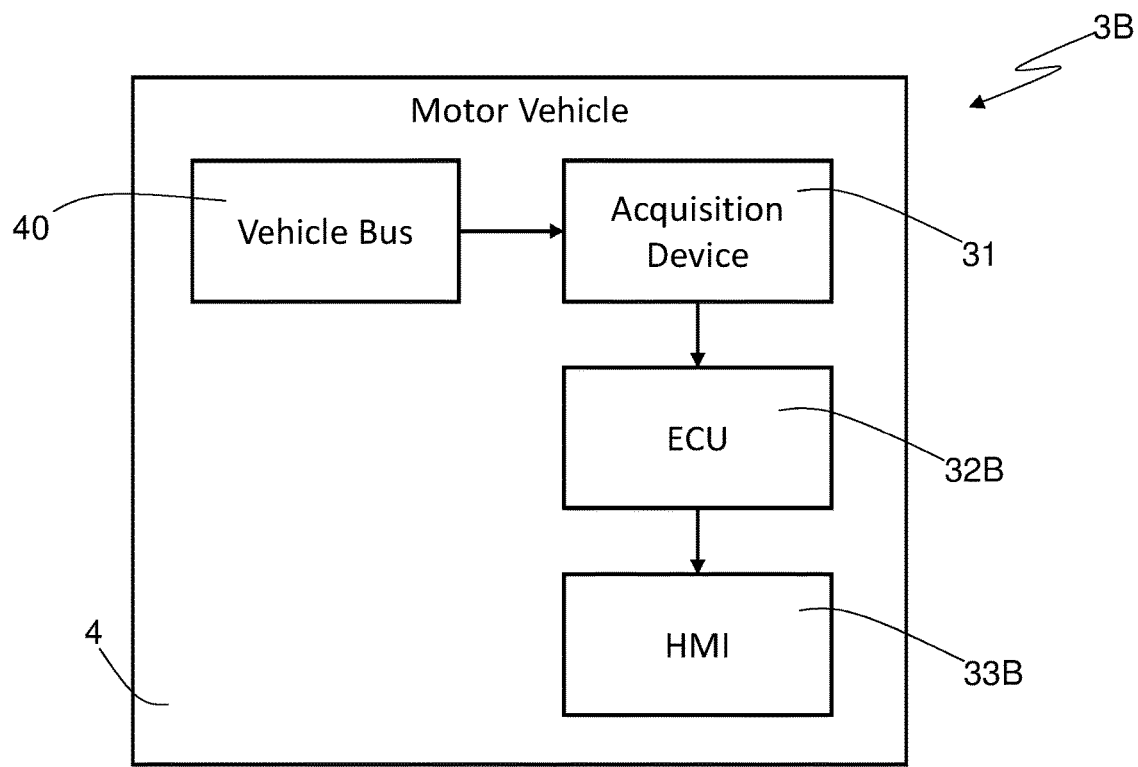

Obviously, the two specific preferred embodiments of the RTM estimation refinement (block 71 in the tread wear monitoring system 3 shown in FIGS. 4 and 5 and previously described in detail may be conveniently exploited to carry out also the improved tread wear monitoring system according to the present invention.

Figure 8:
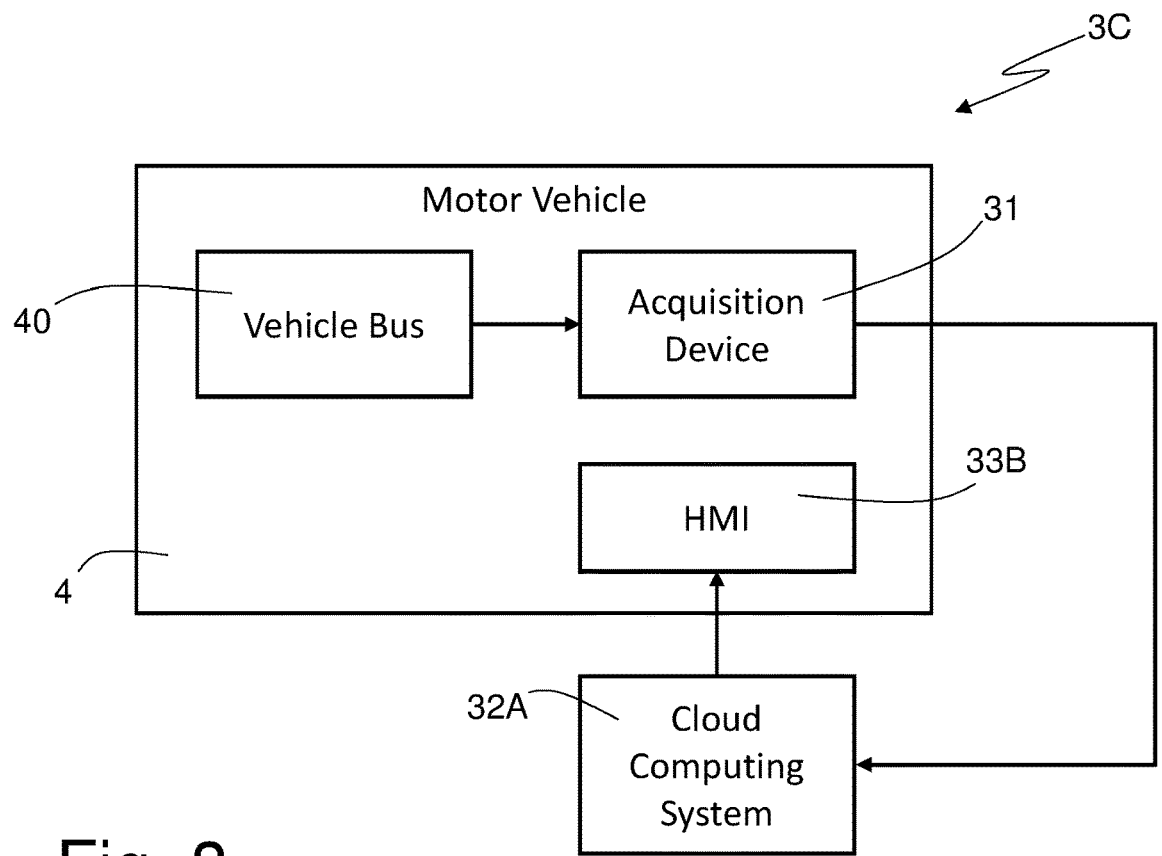
FIG. 8 schematically illustrates a non-limiting example of an improved tread wear monitoring system for carrying out the improved tread wear monitoring step of FIG. 7.

In this connection, it is worth noting that also a hybrid architecture (shown in FIG. 8 and denoted as a whole by 3C) may be conveniently exploited to carry out the improved tread wear monitoring system according to the present invention, wherein the cloud computing system 32A is used along with the HMI 33B (that is installed on board the motor vehicle 4 and is remotely connected to the cloud computing system 32A via one or more wireless networks).

From the foregoing, the technical advantages and the innovative features of the present invention are immediately clear to those skilled in the art.

In particular, it is important to point out that the present invention allows estimating RTM with extremely high accuracy (in particular, with enhanced accuracy with respect to the solution according to 102018000006322) by taking account of irregular tread wear related to tire features and tire usage.

In conclusion, it is clear that numerous modifications and variants can be made to the present invention, all falling within the scope of the invention, as defined in the appended claims.

The invention claimed is:

1. A tread wear monitoring method comprising a preliminary stage and a tread wear monitoring stage;
wherein the preliminary stage comprises:
performing tread wear tests on one or more tires;
measuring tread-wear-related quantities and first frictional-energy-related quantities, wherein the tread-wear-related quantities are indicative of tread wear resulting from the performed tread wear tests, and the first frictional-energy-related quantities are related to frictional energy which the one or more tested tires are subject to during the performed tread wear tests;
determining a calibrated tread wear model based on the measured tread-wear-related and first frictional-energy-related quantities;
determining, based on one or more of the measured tread-wear-related quantities, a first correction factor related to irregular tread wear due to tire features;
training an artificial neural network to provide second correction factors related to irregular tread wear due to tire usage;
wherein the tread wear monitoring stage comprises:
acquiring, from a vehicle bus of a motor vehicle equipped with two or more wheels having respective tires fitted therewith, driving-related quantities related to driving of the motor vehicle;
computing, based on the acquired driving-related quantities and a predefined vehicle dynamics model related to the motor vehicle, second frictional-energy-related quantities related to frictional energy experienced, during driving, by at least one tire of the motor vehicle;

estimating, based on the second frictional-energy-related quantities and the calibrated tread wear model, tread wear experienced by said at least one tire of the motor vehicle during driving; and estimating a current average remaining tread material amount of said at least one tire of the motor vehicle based on the estimated tread wear;

providing a second correction factor via the trained artificial neural network based on one or more of the acquired driving-related quantities, and computing a corrected remaining tread material amount based on the current average remaining tread material amount, the first correction factor and the second correction factor provided via the trained artificial neural network based on the one or more acquired driving-related quantities.

2. The tread wear monitoring method of claim 1, wherein:
the first correction factor is indicative of a first ratio of remaining tread material at a most worn-out tread point to average remaining tread material for irregular tread wear due to tire features; and
each second correction factor is indicative of a respective second ratio of remaining tread material at the most worn-out tread point to average remaining tread material for irregular tread wear due to tire usage.

3. The tread wear monitoring method of claim 1, wherein:
performing the tread wear tests comprises:
defining a test driving route to be simulated; and
performing a tread wear test on a given tire via a tire test device simulating the test driving route;
measuring the tread-wear-related quantities comprises measuring, by means of a tread depth measuring tool, a tread depth profile of the given tire, which tread depth profile results from the simulated test driving route; and
determining the first correction factor comprises:
determining, based on the measured tread depth profile, a first worst-point remaining tread material amount at a most worn-out tread point of the given tire and a first average remaining tread material amount over tread profile of said given tire; and
computing the first correction factor as a ratio of the first worst-point remaining tread material amount to the first average remaining tread material amount.

4. The tread wear monitoring method according to claim 1, wherein the artificial neural network is trained based on a given database including tire-usage-related statistical data and corresponding remaining-tread-material-related statistical data.

5. The tread wear monitoring method of claim 4, wherein:
the tire-usage-related statistical data are indicative of recorded tire-usage-related quantities associated with used tires and resulted in irregular tread wear of said used tires;
the corresponding remaining-tread-material-related statistical data are indicative of pairs of remaining tread material amounts determined for the used tires;
each pair of remaining tread material amounts:
is related to a respective used tire and corresponds to respective recorded tire-usage-related quantities associated with said respective used tire; and
includes a respective second worst-point remaining tread material amount at a most worn-out tread point of the respective used tire and a respective second average remaining tread material amount over tread profile of said respective used tire; and
training the artificial neural network comprises:

computing, for each used tire, a respective second correction factor as a ratio of the respective second worst-point remaining tread material amount to the respective second average remaining tread material amount; and training the artificial neural network by carrying out a supervised learning technique including applying to the artificial neural network, for each used tire, the recorded tire-usage-related quantities associated with said used tire as inputs and the respective second correction factor as output.

6. The tread wear monitoring method of claim 5, wherein:
the recorded tire-usage-related quantities are indicative of transversal and longitudinal accelerations, tire inflation pressures, toes, cambers and loads that are associated with the used tires;
the acquired driving-related quantities include acceleration-related quantities indicative of transversal and longitudinal accelerations of the motor vehicle; and
providing a second correction factor via the trained artificial neural network comprises:
computing, based on the acceleration-related quantities, mean-acceleration-related quantities indicative of mean transversal and longitudinal accelerations of the motor vehicle; and
inputting into the trained artificial neural network the mean-acceleration-related quantities, at least a pressure-related quantity indicative of a tire inflation pressure associated with the at least one tire of the motor vehicle, and quantities related to toe, camber and load that are associated with said at least one tire and said motor vehicle.

7. The tread wear monitoring method of claim 6, wherein:
the pressure-related quantity is included in the acquired driving-related quantities or is a predefined pressure-related quantity; and
the quantities related to toe camber and load are predefined quantities.

8. A tread wear monitoring system comprising:
an acquisition device installed on board a motor vehicle equipped with two or more wheels each having a respective tire fitted therewith, and coupled to a vehicle bus of the motor vehicle to acquire driving-related quantities related to driving of the motor vehicle;
a processing system connected to the acquisition device to receive therefrom the driving-related quantities, the processing system comprising a stored first correction factor related to irregular tread wear due to tire features and an artificial neural network trained to provide second correction factors related to irregular tread wear due to tire usage, the processing system configured to:
compute, based on the acquired driving-related quantities and a predefined vehicle dynamics model related to the motor vehicle, second frictional-energy-related quantities related to frictional energy experienced, during driving, by at least one tire of the motor vehicle;
estimate, based on the second frictional-energy-related quantities and the calibrated tread wear model, tread wear experienced by said at least one tire of the motor vehicle during driving;
estimate a current average remaining tread material amount of said at least one tire of the motor vehicle based on the estimated tread wear;
compute a corrected remaining tread material amount based on the current average remaining tread material amount, the first correction factor and a second correction factor provided via the trained artificial neural network based on the one or more acquired driving-related quantities; and a notification device configured to inform a user associated with the motor vehicle of the corrected remaining tread material amount computed by the processing system.

9. The tread wear monitoring system of claim 8, wherein:
the processing system is a cloud computing system that is wirelessly and remotely connected to the acquisition device; and
the notification device is an electronic communication device associated with the user and remotely connected to the cloud computing system via one or more wired and/or wireless networks.

10. The tread wear monitoring system of claim 8, wherein:
the processing system is a cloud computing system that is wirelessly and remotely connected to the acquisition device; and
the notification device is a human-machine interface that is installed onboard the motor vehicle and is remotely connected to the cloud computing system via one or more wireless networks.

11. The tread wear monitoring system of claim 8, wherein:
the processing system is an electronic control unit installed onboard the motor vehicle; and
the notification device is a human-machine interface installed onboard the motor vehicle.

12. The tread wear monitoring system of claim 8, wherein the first correction factor is indicative of a first ratio of remaining tread material at a most worn-out tread point to average remaining tread material for irregular tread wear due to tire features, and each second correction factor is indicative of a respective second ratio of remaining tread material at the most worn-out tread point to average remaining tread material for irregular tread wear due to tire usage.

13. The tread wear monitoring system of claim 8, wherein the artificial neural network is trained based on a given database including tire-usage-related statistical data and corresponding remaining-tread-material-related statistical data.

14. The tread wear monitoring system of claim 13, wherein:
the tire-usage-related statistical data are indicative of recorded tire-usage-related quantities associated with used tires and resulted in irregular tread wear of said used tires;
the corresponding remaining-tread-material-related statistical data are indicative of pairs of remaining tread material amounts determined for the used tires;
each pair of remaining tread material amounts:
is related to a respective used tire and corresponds to respective recorded tire-usage-related quantities associated with said respective used tire; and
includes a respective second worst-point remaining tread material amount at a most worn-out tread point of the respective used tire and a respective second average remaining tread material amount over tread profile of said respective used tire; and
training the artificial neural network comprises:
computing, for each used tire, a respective second correction factor as a ratio of the respective second worst-point remaining tread material amount to the respective second average remaining tread material amount; and the artificial neural network is trained by carrying out a supervised learning technique including applying to the artificial neural network, for each used tire, the recorded tire-usage-related quantities associated with said used tire as inputs and the respective second correction factor as output.

15. The tread wear monitoring system of claim 14, wherein:
the recorded tire-usage-related quantities are indicative of transversal and longitudinal accelerations, tire inflation pressures, toes, cambers and loads that are associated with the used tires;
the acquired driving-related quantities include acceleration-related quantities indicative of transversal and longitudinal accelerations of the motor vehicle; and
providing a second correction factor via the trained artificial neural network comprises:
computing, based on the acceleration-related quantities, mean-acceleration-related quantities indicative of mean transversal and longitudinal accelerations of the motor vehicle; and
inputting into the trained artificial neural network the mean-acceleration-related quantities, at least a pressure-related quantity indicative of a tire inflation pressure associated with the at least one tire of the motor vehicle, and quantities related to toe, camber and load that are associated with said at least one tire and said motor vehicle.

16. The tread wear monitoring system of claim 15, wherein:
the pressure-related quantity is included in the acquired driving-related quantities or is a predefined pressure-related quantity; and
the quantities related to toe camber and load are predefined quantities.

17. A cloud computing system having stored thereon a first correction factor related to irregular tread wear due to tire features and comprising an artificial neural network trained to provide second correction factors related to irregular tread wear due to tire usage, the cloud computing system configured to:
receive driving-related quantities related to driving of a motor vehicle, the motor vehicle equipped with two or more wheels each having a respective tire fitted therewith, from an acquisition device installed onboard the motor vehicle and wirelessly and remotely coupled to the cloud computing system;
compute, based on the acquired driving-related quantities and a predefined vehicle dynamics model related to the motor vehicle, second frictional-energy-related quantities related to frictional energy experienced, during driving, by at least one tire of the motor vehicle;
estimate, based on the second frictional-energy-related quantities and the calibrated tread wear model, tread wear experienced by said at least one tire of the motor vehicle during driving;
estimate a current average remaining tread material amount of said at least one tire of the motor vehicle based on the estimated tread wear; and
compute a corrected remaining tread material amount based on the current average remaining tread material amount, the first correction factor and a second correction factor provided by the trained artificial neural network based on the one or more acquired driving-related quantities.

18. The cloud computing system of claim 17, wherein the first correction factor is indicative of a first ratio of remaining tread material at a most worn-out tread point to average remaining tread material for irregular tread wear due to tire features, and each second correction factor is indicative of a respective second ratio of remaining tread material at the most worn-out tread point to average remaining tread material for irregular tread wear due to tire usage.

19. The cloud computing system of claim 17, wherein the artificial neural network is trained based on a given database including tire-usage-related statistical data and corresponding remaining-tread-material-related statistical data.

20. The cloud computing system of claim 19, wherein:
the tire-usage-related statistical data are indicative of recorded tire-usage-related quantities associated with used tires and resulted in irregular tread wear of said used tires;
the corresponding remaining-tread-material-related statistical data are indicative of pairs of remaining tread material amounts determined for the used tires;
each pair of remaining tread material amounts:
is related to a respective used tire and corresponds to respective recorded tire-usage-related quantities associated with said respective used tire; and
includes a respective second worst-point remaining tread material amount at a most worn-out tread point of the respective used tire and a respective second average remaining tread material amount over tread profile of said respective used tire; and
training the artificial neural network comprises:
computing, for each used tire, a respective second correction factor as a ratio of the respective second worst-point remaining tread material amount to the respective second average remaining tread material amount; and
the artificial neural network is trained by carrying out a supervised learning technique including applying to the artificial neural network, for each used tire, the recorded tire-usage-related quantities associated with said used tire as inputs and the respective second correction factor as output.

21. The cloud computing system of claim 20, wherein:
the recorded tire-usage-related quantities are indicative of transversal and longitudinal accelerations, tire inflation pressures, toes, cambers and loads that are associated with the used tires;
the acquired driving-related quantities include acceleration-related quantities indicative of transversal and longitudinal accelerations of the motor vehicle; and
providing a second correction factor via the trained artificial neural network comprises:
computing, based on the acceleration-related quantities, mean-acceleration-related quantities indicative of mean transversal and longitudinal accelerations of the motor vehicle; and
inputting into the trained artificial neural network the mean-acceleration-related quantities, at least a pressure-related quantity indicative of a tire inflation pressure associated with the at least one tire of the motor vehicle, and quantities related to toe, camber and load that are associated with said at least one tire and said motor vehicle.

22. The cloud computing system of claim 21, wherein:
the pressure-related quantity is included in the acquired driving-related quantities or is a predefined pressure-related quantity; and
the quantities related to toe camber and load are predefined quantities.

23. An electronic control unit installed onboard a motor vehicle equipped with two or more wheels each having a respective tire fitted therewith, comprising a stored first correction factor related to irregular tread wear due to tire features and an artificial neural network trained to provide second correction factors related to irregular tread wear due to tire usage, the electronic control unit configured to:
receive driving-related quantities related to driving of the motor vehicle from an acquisition device installed onboard the motor vehicle;
compute, based on the acquired driving-related quantities and a predefined vehicle dynamics model related to the motor vehicle, second frictional-energy-related quantities related to frictional energy experienced, during driving, by at least one tire of the motor vehicle;
estimate, based on the second frictional-energy-related quantities and the calibrated tread wear model, tread wear experienced by said at least one tire of the motor vehicle during driving;
estimate a current average remaining tread material amount of said at least one tire of the motor vehicle based on the estimated tread wear; and
compute a corrected remaining tread material amount based on the current average remaining tread material amount, the first correction factor and a second correction factor provided by the trained artificial neural network based on the one or more acquired driving-related quantities.

24. The electronic control unit of claim 23, wherein the first correction factor is indicative of a first ratio of remaining tread material at a most worn-out tread point to average remaining tread material for irregular tread wear due to tire features, and each second correction factor is indicative of a respective second ratio of remaining tread material at the most worn-out tread point to average remaining tread material for irregular tread wear due to tire usage.

25. The electronic control unit of claim 23, wherein the artificial neural network is trained based on a given database including tire-usage-related statistical data and corresponding remaining-tread-material-related statistical data.

26. The electronic control unit of claim 25, wherein:
the tire-usage-related statistical data are indicative of recorded tire-usage-related quantities associated with used tires and resulted in irregular tread wear of said used tires;
the corresponding remaining-tread-material-related statistical data are indicative of pairs of remaining tread material amounts determined for the used tires;
each pair of remaining tread material amounts:
is related to a respective used tire and corresponds to respective recorded tire-usage-related quantities associated with said respective used tire; and
includes a respective second worst-point remaining tread material amount at a most worn-out tread point of the respective used tire and a respective second average remaining tread material amount over tread profile of said respective used tire; and
training the artificial neural network comprises:
computing, for each used tire, a respective second correction factor as a ratio of the respective second worst-point remaining tread material amount to the respective second average remaining tread material amount; and
training the artificial neural network by carrying out a supervised learning technique including applying to the artificial neural network, for each used tire, the recorded tire-usage-related quantities associated with said used tire as inputs and the respective second correction factor as output.

27. The electronic control unit of claim 26, wherein:

the recorded tire-usage-related quantities are indicative of transversal and longitudinal accelerations, tire inflation pressures, toes, cambers and loads that are associated with the used tires;

the acquired driving-related quantities include acceleration-related quantities indicative of transversal and longitudinal accelerations of the motor vehicle; and providing a second correction factor via the trained artificial neural network comprises:

computing, based on the acceleration-related quantities, mean-acceleration-related quantities indicative of mean transversal and longitudinal accelerations of the motor vehicle; and inputting into the trained artificial neural network the mean-acceleration-related quantities, at least a pressure-related quantity indicative of a tire inflation pressure associated with the at least one tire of the motor vehicle, and quantities related to toe, camber and load that are associated with said at least one tire and said motor vehicle.

28. The electronic control unit of claim 27, wherein:

the pressure-related quantity is included in the acquired driving-related quantities or is a predefined pressure-related quantity; and the quantities related to toe camber and load are predefined quantities.

* * * * *